United States Patent
Birsan et al.

(10) Patent No.: US 11,303,699 B1
(45) Date of Patent: Apr. 12, 2022

(54) DYNAMIC CONFIGURATION OF MULTI-PART TRANSFERS

(71) Applicant: Shopify Inc., Ottawa (CA)

(72) Inventors: Diana Rebeca Birsan, Ottawa (CA); Philibert Dugas, Terrebonne (CA); John Jong-Suk Lee, Waterloo (CA)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 17/338,853

(22) Filed: Jun. 4, 2021

(51) Int. Cl.
*H04L 67/06* (2022.01)

(52) U.S. Cl.
CPC .................. *H04L 67/06* (2013.01)

(58) Field of Classification Search
CPC ..................................................... H04L 67/06
See application file for complete search history.

(56) References Cited

U.S. PATENT DOCUMENTS

| | | | | |
|---|---|---|---|---|
| 9,270,761 B1* | 2/2016 | Logue | ................... | H04L 67/141 |
| 10,587,465 B1* | 3/2020 | Sandham | ................... | G06F 8/60 |
| 2010/0332677 A1* | 12/2010 | Tian | ........................ | H04L 67/16 |
| | | | | 709/233 |
| 2013/0110939 A1* | 5/2013 | Yang | ........................ | H04L 51/38 |
| | | | | 709/206 |
| 2015/0253946 A1* | 9/2015 | Chandrasekaran | ..... | G06F 16/10 |
| | | | | 715/748 |
| 2016/0127457 A1* | 5/2016 | Shaw | .................... | H04W 4/029 |
| | | | | 709/204 |
| 2019/0068501 A1* | 2/2019 | Schneider | ............... | H04L 47/10 |

* cited by examiner

*Primary Examiner* — Chris Parry
*Assistant Examiner* — Weiwei Y Stiltner
(74) *Attorney, Agent, or Firm* — Rowand LLP

(57) ABSTRACT

Method and system for determining a size of an initial part of a multi-part transferor are described. In one aspect, a computer-implemented method includes: receiving, by a computing system and from a client device associated with a particular transferor, a request for a transfer initiation interface; determining, based on a transfer history for the particular transferor, a size of an initial part of a multi-part transfer; and providing, to the client device, the transfer initiation interface, the transfer initiation interface indicating the size of the initial part of the multi-part transfer and including a selectable option to initiate the transfer of the initial part of the multi-part transfer.

20 Claims, 10 Drawing Sheets

| Transferor | Multipart Completions | Multipart Failures | Average Completion Size | Average Failure Size | Reliability Score |
|---|---|---|---|---|---|
| A | 20 | 1 | 100 | 10 | 95 |
| B | 1 | 10 | 10 | 10 | 9 |
| C | 40 | 4 | 10 | 150 | 91 |
| D | 10 | 10 | 5 | 20 | 50 |
| E | 20 | 23 | 4 | 7 | 47 |

DYNAMIC CONFIGURATION OF MULTI-PART TRANSFERS

TECHNICAL FIELD

The present disclosure relates to electronic transfers and, more particularly, to methods and systems for dynamically configuring multi-part transfers.

BACKGROUND

Electronic transfers between physical and logical storage locations may sometimes be separated into multiple parts. By way of example, a large transfer may be separated into two or more parts. A first part may be sent immediately and a second part may be sent after the first part. Separating transfers into multiple parts may occur for a number of reasons, including in order to manage the use of available resources. By way of example, separating a transfer into multiple parts may be useful to better control the use of bandwidth, or account resources.

Multi-part transfers do, however, sometimes result in missing part scenarios in which a first part of the transfer may be received by a recipient but another part of the transfer may never be received by the recipient. A part of the transfer may not be received for any one of a number of reasons. By way of example, a transfer failure may be caused by a system failure, or by failure of a transferor (who may also be referred to as a sender) to initiate sending of a part of the transfer, or due to a lack of resources associated with a transferor or transferor system.

BRIEF DESCRIPTION OF THE DRAWINGS

Embodiments will be described, by way of example only, with reference to the accompanying figures wherein.

DETAILED DESCRIPTION

Figure 1A:
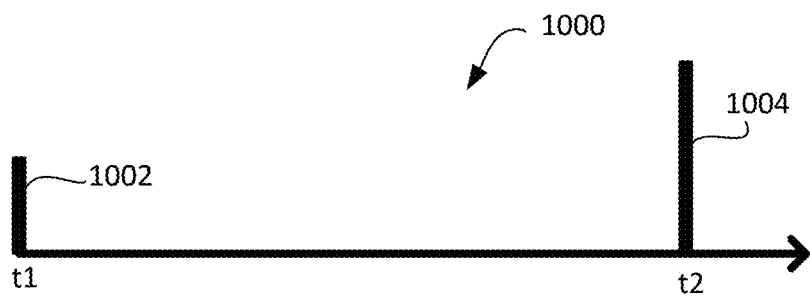
FIGS. 1A, 1B, 1C and 1D shows example time series of multi-part transfers.

In an aspect, the present application discloses a computer-implemented method for providing a transfer initiation interface to a client device that may be used for initiating a transfer according to a customized transfer schedule. The computer-implemented method may include: receiving, by a computing system and from a client device associated with a particular transferor, a request for a transfer initiation interface; determining, based on a transfer history for the particular transferor, a size of an initial part of a multi-part transfer; and providing, to the client device, the transfer initiation interface, the transfer initiation interface indicating the size of the initial part of the multi-part transfer and including a selectable option to initiate the transfer of the initial part of the multi-part transfer.

In some implementations, the methods and systems described herein may advantageously require transferors who are more prone to failures to provide a larger initial part of a transfer than other transferors who are not prone to failures. For example, transferors that have a history of failing to transfer all parts of a multi-part transfer may be configured to provide a larger initial part than other transferors who have a history of successfully transferring all parts. Conveniently, in this way, the methods and systems may increase the overall amount of transferred units from transferors.

In some implementations, the method may include receiving a request to initiate a transfer of the initial part of the multi-part transfer through the selectable option of the transfer initiation interface. The method may also include, after receiving the request to initiate the transfer of the initial part of the multi-part transfer, configuring a transfer of the initial part of the transfer from the particular transferor.

In some implementations, determining the size of the initial part of the multi-part transfer may include determining a relatively smaller size if the particular transferor has a history of successfully completing multi-part transfers than would be determined if the particular transferor has a history of failing to complete multi-part transfers.

In some implementations, determining the size of the initial part of the multi-part transfer may include determining a reliability score for the particular transferor and wherein the size of the initial part is determined based on the reliability score for the particular transferor.

In some implementations, the size of the initial part of the multi-part transfer may be determined based on a metric of the size of past transfers that were successfully completed by the particular transferor.

In some implementations, the size may be further determined based on a configuration parameter defined by a recipient. The configuration parameter may define a range of supported initial part sizes.

In some implementations, the method may include determining a reliability score for the recipient. The transfer initiation interface may include the reliability score for a recipient.

In some implementations, the reliability score for the recipient may be determined based on a transfer history associated with the recipient.

In some implementations, the method may include determining a reliability score for the recipient and the size of an initial part of the multi-part transfer may be determined based on the reliability score for a recipient.

In some implementations, the method may include determining a maximum size of initial parts for transfers to the recipient based on the reliability score for the recipient. The size of the initial part may be determined to not exceed the maximum size for initial parts.

In another aspect, the present application discloses a computing system. The computing system includes a processor and a memory storing computer-executable instructions that, when executed, are to cause the processor to carry out at least some of the operations of a method described herein. For example, in an implementation, the instructions may configure the processor to: receive, by a computing system and from a client device associated with a particular transferor, a request for a transfer initiation interface; determine, based on a transfer history for the particular transferor, a size of an initial part of a multi-part transfer; and provide, to the client device, the transfer initiation interface, the transfer initiation interface indicating the size of the initial part of the multi-part transfer and including a selectable option to initiate the transfer of the initial part of the multi-part transfer.

In yet another aspect, the present application discloses a non-transitory, computer-readable medium storing computer-executable instructions that, when executed by a processor, are to cause the processor to carry out at least some of the operations of a method described herein. For example, in an implementation, the instructions may configure the processor to: receive, by a computing system and from a client device associated with a particular transferor, a request for a transfer initiation interface; determine, based on a transfer history for the particular transferor, a size of an initial part of a multi-part transfer; and provide, to the client device, the transfer initiation interface, the transfer initiation interface indicating the size of the initial part of the multi-part transfer and including a selectable option to initiate the transfer of the initial part of the multi-part transfer.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " and the phrase "at least one of . . . or . . . " are intended to cover any one or more of the listed elements, including any one of the listed elements alone, any sub-combination, or all of the elements, without necessarily excluding any additional elements, and without necessarily requiring all of the elements.

Reference will now be made to FIG. 1A, which diagrammatically illustrates an example timeline 1000 of a multi-part transfer. In the example, the multi-part transfer includes two parts—a first part 1002 transferred or scheduled to be transferred at a first time t1 and a second part 1004 transferred or scheduled to be transferred at a second time t2. The second time t2 is after the first time. In the example, the first part 1002 of the transfer has a small size relative to the second part 1004 of the transfer. That is, the first part 1002 is for less units than the second part 1004. Put differently, the first part 1002 is lower in magnitude than the second part 1004. In the illustrated example, the first part represents a transfer that is one unit in size and the second part represents a transfer that is two units in size. The total amount of the transfer is the sum of all parts of the multi-part transfer and is, in the example, three units in size.

If the multi-part transfer of FIG. 1A is completed, then all three units are transferred. However, if a failure occurs for any reason that prevents the second part 1004 from being transferred, then only the first part 1002 is transferred. In the illustrated example, the completion failure may cause only one of the three total units to be transferred.

Figure 1B:
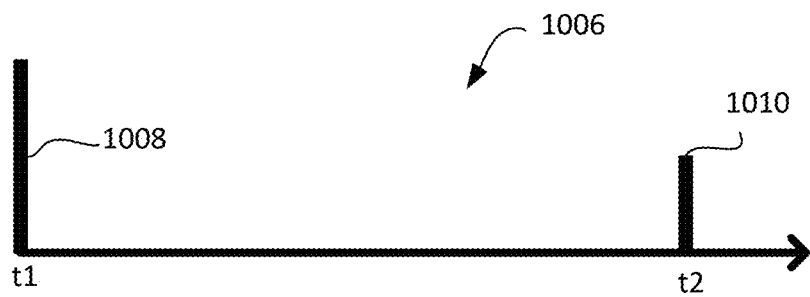

However, if the multi-part transfer were configured differently than the example of FIG. 1A, the effect of the completion failure may be less significant. For example, reference will now be made to FIG. 1B, which diagrammatically illustrates a further example timeline 1006 of a multi-part transfer. In the illustrated example, the first part 1008, which is scheduled to occur at a first time t1, is larger than the first part 1002 in the example of FIG. 1A and the second part 1010, which is scheduled to occur at a time t2, is relatively smaller than the second part 1004 of the example of FIG. 1A. In this way, if a completion failure affecting the second part 1010 occurs, the overall size of the completed portion of the transfer is higher than in the example of FIG. 1A. For example, in the multi-part transfer of FIG. 1A, the first part 1008 is for two units while the second part 1010 is for one unit. In the example of FIG. 1B, if a failure occurs that prevents the transfer of the second part 1010, then the completed portion of the transfer is for a greater amount than in the example of FIG. 1A. In the example of FIG. 1B, if only the first part 1008 is received, then the completed portion of the transfer is for two units.

Figure 1C:
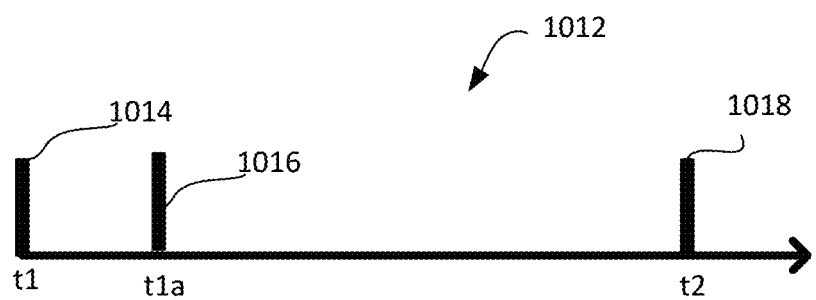

Reference will now be made to FIG. 1C, which diagrammatically illustrates a further example timeline 1012 of a multi-part transfer. FIG. 1C provides a further example of how a multi-part transfer may be configured to reduce the effect of a failure. In the illustrated example, the number of parts of the multi-part transfer is greater than in the multi-part transfer of FIG. 1B. For example, the multi-part transfer of FIG. 1C has three parts whereas the multi-part transfer of FIG. 1A has only two parts over approximately the same period of time. Put differently a third part 1018 of the transfer of FIG. 1C may be made or scheduled to be made at approximately the same time as the second part 1004 of the transfer of FIG. 1A. For example, the first part 1014 of the transfer of FIG. 1C may be made or scheduled to be made at the first time t1, the second part 1016 of the transfer may be made or scheduled to be made at a time t1a which is later than the first time t1, and the third part 108 of the transfer may be made or scheduled to be made at a time t2 that is later than the second time t1a. In this way, if a failure were to occur after the time t1a that prevented the third part 1018 from being transferred, the completed portion of the transfer would be greater than if the same failure occurred in the example of FIG. 1A. For example, in the example of FIG. 1C if all parts of the transfer are for one unit and if the first part 1014 and the second part 1016 were successfully transferred but the third part was not successfully transferred, then the completed portion of the transfer would be for two units. This, of course, is greater than the amount completed if the failure affected the second part 1004 in the example of FIG. 1A. In the example of FIG. 1A, the completed portion of the transfer would be for one unit.

Figure 1D:
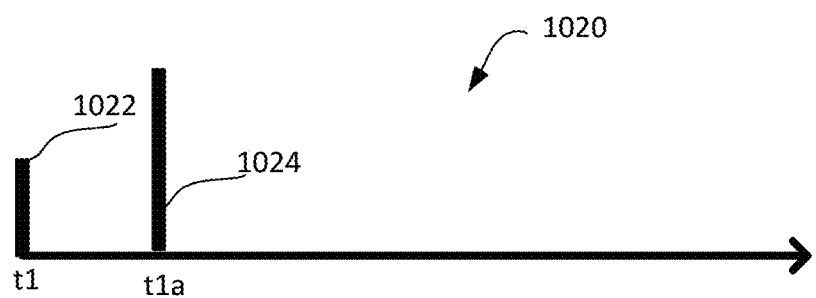

Reference will now be made to FIG. 1D, which diagrammatically illustrates a further example timeline 1020 of a multi-part transfer. FIG. 1D provides a further example of how a multi-part transfer may be configured to reduce the effect of a failure. In the illustrated example, the multi-part transfer described in FIG. 1A has been adjusted to reduce the time between parts of the transfer. For example, a first part 1022 is transferred, or is scheduled to be transferred, at a time t1 and a second part 1024 is transferred, or is scheduled to be transferred, at a time t1a. The time t1a at which the second part 1024 is to be transferred is prior to the time t2 when the second part 1004 of FIG. 1A is scheduled to be transferred. In the example of FIG. 1D, the size of the transfers is the same as the size of the transfers of the example in FIG. 1A but the time span between consecutive transfers is shortened. In this way, a failure that occurs later (i.e., after the time t1a) may not affect the transfer. For example, if a failure occurs after time t1a which prevents further transfers, the multi-part transfer may be successfully completed.

As illustrated in FIGS. 1A to 1D, a variety of techniques may be used to reduce the effect of an incomplete multi-part transfer. For example, the effect of a failure to complete a multipart transfer may be mitigated by increasing an amount of a first part of the transfer (as in the example of FIG. 1B), by separating the transfer into a greater number of parts over the same time period (as in the example of FIG. 1C) or by reducing the time period between a first transfer and a last transfer (as in the example of FIG. 1D). At least some of these techniques may, however, result in some undesirable consequences. For example, in implementations in which the size of a transfer part affects bandwidth or computing resources required to complete the transfer of that part, if all multi-part transfers are configured to have a very large first part of the transfer, there may be a large spike in the network or other computing resources used when the initial parts of the transfers are sent by a large number of transferors at or near the same time. Additionally, or alternatively, where a transfer represents a movement of a resource between logical storage locations which, after the transfer, deprives the transferor of continued use of the transferred portion, a large initial part may deprive the transferor of a large portion of the resource immediately. This may, for example, deter some transferors from initiating the transfer in the first place. Consequently, a greater amount of overall units of resources transfers may be achieved by utilizing the approach of FIG. 1A for at least some transferors. That is, for at least some transferors, the back-loaded approach of FIG. 1A may be preferred over the comparatively front-loaded approaches of FIGS. 1B to 1D. Put differently, for some transferors, a system, node or recipient may benefit from reducing an initial transfer part whereas for other transferors, the system, node or recipient may benefit from increasing the initial transfer part.

In order to dynamically configure multi-part transfers, a system and method may be configured to determine a transfer technique or transfer schedule based on the particular transferor making the transfer.

The method and system may dynamically configure multi-part transfers so as to maximize the usable transferred content or value derived from both completed and partially completed transfers. A completed transfer, as used herein, refers to a multi-part transfer for which all parts of the transfer have been received. A partially completed transfer, as used herein, refers to multi-part transfers for which only a portion of the parts are received.

Each part of the multi-part transfer for a given transfer may be transferred or arranged in a manner so that it is usable even without the other of the parts of that same transfer. For example, where the transfer is a data transfer, the transfer may be formatted in a manner that allows the first part (which may also be referred to herein as an initial part) to be output or otherwise used without the other parts of the transfer. In this way, individual parts may be useful even if later parts of a transfer are never received. Using a simple example, if the transfer represented a transfer of content, such as a written document, each part of the transfer might involve a particular number of pages of the document. In another example, if the transfer represented a transfer of a video or audio file, each part of the transfer may represent a time segment of the video or audio file which, when stitched together, form the complete audio or video file. In another example, the transfer may represent a transfer of value, such as a transfer of a particular number of units of value. The "value" may be anything of value that may be digitally represented including, for example, units representing a number of resources. The resources may be computing resources, monetary resources, or resources of another type.

In order to mitigate risks of partial transfers, the method and system may configure a size of each of the various parts of the transfer to maximize the overall quantity of data and/or resources being transferred. As will be described in greater detail below, the system may consider past successes in multi-part transfers from a transferor to determine the size of each of the various parts of the transfer or, in some implementations, other aspects of the schedule of multi-part transfers apart from size. For example, a transferor that has successfully completed multi-part transfers in the past may have a smaller initial transfer part than a transferor that has failed to complete multi-part transfers in the past. The system may learn which transferors may be more likely to fail to send later parts of a transfer due to, for example, repetitive system failures affecting such systems. The system may then require unreliable transferors to provide a larger initial transfer part than reliable transferors. Conveniently, in this way, the system may operate to increase an overall amount of content or value being transferred as compared with systems that do not utilize this dynamic sizing approach.

In order to dynamically size transfer parts, the system may track past transfers on a per-transferor basis. For example, a transferor who has initiated a multi-part transfer in the past may be associated with an account or a profile. The account or profile may include or be associated with transfer history data indicating whether past multi-part transfers were successfully completed or whether past multi-part transfers were incomplete. A multi-part transfer may be successfully completed if all parts are received. A multi-part transfer may be considered to be incomplete if at least one transfer part was not received by an expected deadline for that transfer part.

The system may consider other criteria instead of or in addition to the transferor's history of completed multi-part transfers. For example, the system may consider an overall size of past transfers. Past completed transfers that are relatively large may be considered to increase the reliability of a transferor and may, therefore, cause the system to configure multi-part transfers for such transferors to have a relatively smaller initial part.

Figure 2:
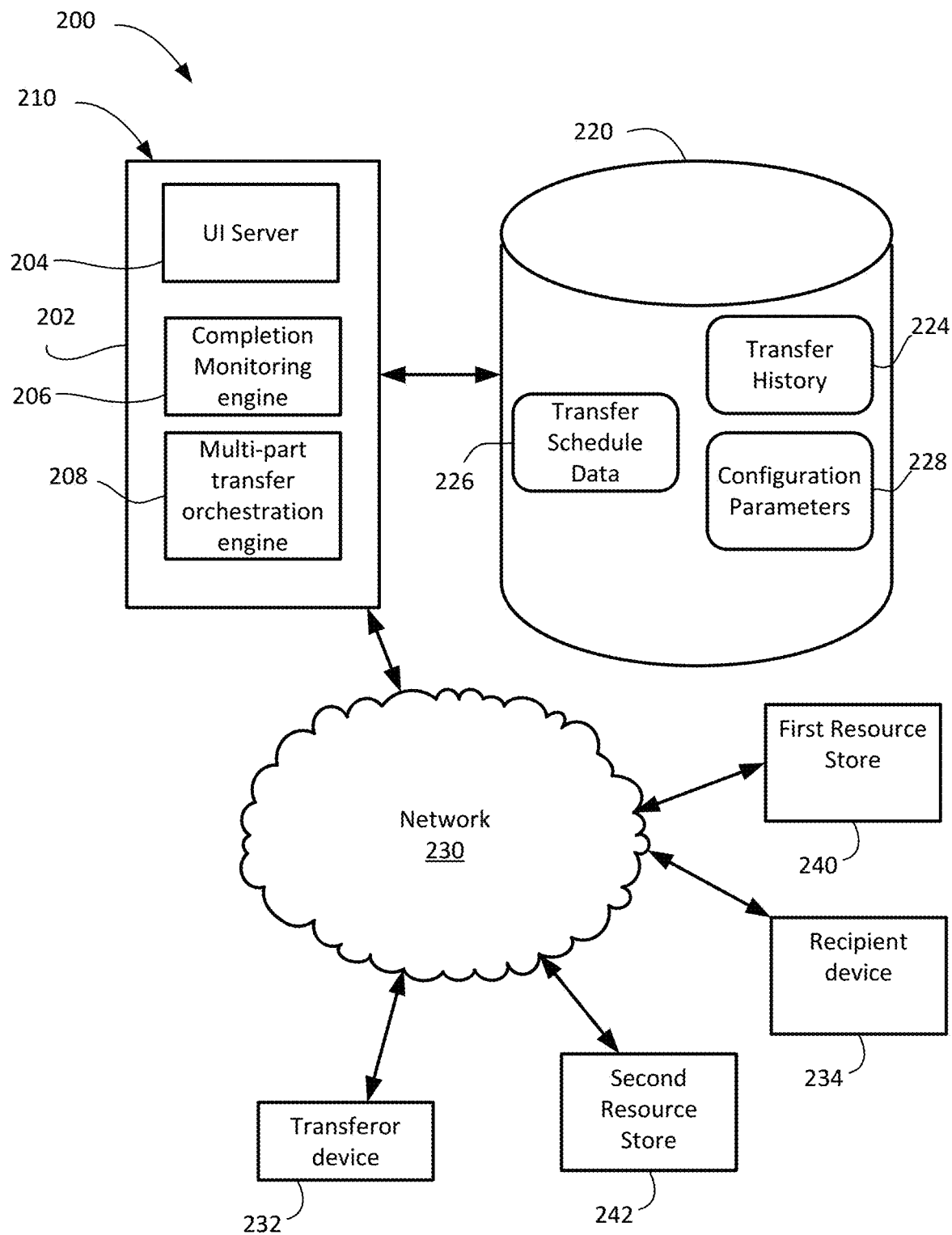
FIG. 2 shows a simplified example of a multi-part transfer system.

Reference is now made to FIG. 2, which diagrammatically illustrates an example system 200 for orchestrating multi-part transfers. The system 200 may include a central server 210 connected to a computing network 230. The central server 210 is a computing system. The central server 210 may serve as a controller or control system for the processing of requests. The central server 210 may be configured to receive a request for a transfer initiation interface from a transferor device 232 and to provide, to the transferor device 232, a transfer initiation interface that indicates a customized transfer schedule. For example, the transfer initiation interface may indicate a size of an initial part of a transfer and the size may be determined based on a transfer history for the particular transferor.

The transfer that may be initiated using the transfer initiation interface may be a transfer between a storage location associated with transferor and/or a transferor device 232 to a storage location associated with a recipient and/or a recipient device 234. The recipient may also be referred to herein as a transferee. One or more of these storage locations may be on-device storage locations or one or more of these storage locations may be off-device. The storage location associated with the transferor and/or transferor device 232 may be referred to as a first resource store 240 and the storage location associated with the recipient and/or recipient device 234 may be referred to as a second resource store 242. In the illustrated example, the first resource store 240 and the second resource store 242 are off-device. That is, the first resource store 240 and the second resource store 242 are provided on other systems, apart from the transferor device 232 and recipient device 234. However, as noted above one or both of these resource-stores may be on-device in other implementations.

The first resource store 240 and the second resource store 242 may be connected to one or more networks, such as the computing network 230. The first resource store 240 and the second resource store 242 may be connected to other networks instead of or in addition to the computing network 230. For example, in some implementations, the first resource store 240 and the second resource store 242 may be connected to one another over a private or semi-private network.

In the example of FIG. 2, the first resource store 240 and the second resource store 242 are illustrated as separate blocks. The first resource store 240 and the second resource store 242 may be different physical storage areas or devices. For example, the first resource store 240 and the second resource store 242 may be in geographically disparate locations. Put differently, the recipient and transferor may use physically different resource stores.

In some implementations and in some situations, the recipient and transferor may use a common off-device store. By way of example, where the resource stores represent cloud storage, the same cloud storage may be used by both recipient and transferor. Or, where the resource stores are associated with banks or other value stores, the same bank systems may be used by both transferor and recipient. In such situations, the separate blocks in FIG. 2 illustrate how the recipient and the transferor are associated with different logical storage areas. Logical storage areas may be or include any one or more of accounts, profiles or records. For example, the resource stores may be or include a database and the first resource store 240 may be or include one record in the database and the second resource store 242 may be or include another record in the same database or in a different database.

The transferor device 232 is a computing system associated with a transferor. The transferor device may be of various types including, for example, a desktop or laptop computer, a tablet device, a mobile device such as a smartphone, a wearable device such as a smart watch, or a device of another type. The transferor device 232 may be used for a variety of purposes including for initiating a transfer from the first resource store 240 to the second resource store 242. In at least some implementations, the transferor device 232 may be associated with a customer. The transferor device 232 may be referred to as a customer device or a client device.

The recipient device 234 is a computing system associated with a recipient. The recipient device may be of the same or a different type than the transferor device 232. The recipient device may be of various types including, for example, a desktop or laptop computer, a tablet device, a mobile device such as a smartphone, a wearable device such as a smart watch, or a device of another type. The recipient device 234 may be used for a variety of purposes including for defining one or more configuration parameters 228 that are to be used by the central server 210 in order to determine a size of an initial part of a multi-part transfer. For example, the central server 210 may provide a transfer configuration user interface to the recipient device 234. This user interface may be provided to the recipient device 234 before the transferor device 232 initiates a transfer. The transfer configuration user interface may allow the recipient device 234 to define configuration parameters that are to be used for transfers made to the recipient. That is, the configuration parameters may be used for transfers made to the second resource store 242. The configuration parameters may apply to all such transfers or they may only apply to transfers that meet defined criteria. The defined criteria may be defined by the recipient device.

An example of one possible configuration parameter that may be defined by the recipient device 234 is a minimum size of an initial part of a transfer. Another example configuration parameter is a maximum size of an initial part of a transfer. In some implementations, the recipient device 234 may define both maximum and minimums for an initial part of a transfer. This maximum and/or minimum may be used by the central server in order to select a size of an initial part for a transfer for a particular transferor. For example, the central server 210 may select a size that is greater than the minimum size and/or less than the maximum size.

The central server 210 may be configured to orchestrate, schedule, or otherwise manage transfers. By way of example, the central server 210 may be configured to perform one or more operations of a method defined herein. The central server 210 may include various engines, components, modules, systems or servers that perform functions described herein. For example, a user interface server 204 may be configured to serve user interfaces to the transferor device 232 and/or the recipient device 234. For example, the user interface server 204 may be configured to provide a transfer configuration user interface to a recipient device and/or may be configured to provide a transfer initiation interface to the transfer device. The transfer configuration user interface may allow the recipient device to be used to define configuration parameters that will be used by the central server 210 to determine a size of an initial part of a multi-part transfer and the transfer initiation interface may be used by the recipient to initiate a transfer.

In providing the interface, the central server 210 may provide an entire interface or a portion thereof. In some implementations, the interface may be a web-based interface and the UI server 204 may be a web server. In at least some such implementations, the interface may be provided as a HyperText Markup Language (HTML) page, or it may be of another type. In some implementations, the device outputting the interface, such as the transferor device 232 may have stored thereon an application that is configured to output the interface. The application may be a web browser or a stand-alone application.

As noted above, the central server 210 may be configured to orchestrate, schedule, or otherwise manage a transfer. In some implementations, the central server 210 may include a multi-part transfer orchestration engine 208. The multi-part transfer orchestration engine 208 may be configured to determine a size of one or more parts of a transfer. For example, the multi-part transfer orchestration engine 208 may be configured to determine a size of an initial part of the multi-part transfer for a particular transferor. As noted above, the size may be determined based on the configuration parameters 228. Additionally or alternatively, the size may be determined based on data associated with the particular transferor. For example, a transfer history 224 may be used to determine the size of the initial part. The transfer history 224 indicates past completion information for one or more transferors. Example transfer histories 224 will be described in greater detail below with reference to FIG. 3.

The multi-part transfer orchestration engine 208 may provide the determined size of the initial part to the UI server 204 and the UI server 204 may use this size to affect the transfer initiation interface provided to a transferor device 232. For example, the transfer initiation interface may indicate the size of the initial part of the multi-part transfer and may include a selectable option to initiate a transfer of the size of the initial part of the multi-part transfer.

The multi-part transfer orchestration engine 208 may store transfer schedule data 226 in a data store 220. The transfer schedule data 226 may define, for example, the amount of various parts of a multi-part transfer. For example, using the example timeline 1000 of FIG. 1A, the transfer schedule data 226 may store the size or amount of the first part 1002 of a multi-part transfer. In the example, the multi-part transfer includes two parts—a first part 1002 and a second part and the size of each of these parts may be recorded in the transfer schedule data 226. The transfer schedule data 226 may be used, for example, to prompt a transferor to transfer a second part of a transfer when certain preconditions to such a transfer have occurred. For example, such a prompt may be generated after a predetermined amount of time has elapsed following the transfer of the first part 1002. In some implementations, the transfer schedule data 226 may include timing information specifying when a part of the transfer is to be made.

As illustrated in FIG. 2, any one or more of the transfer history 224, transfer schedule data 226 and configuration parameters 228 may be stored in a data store. Such data may be stored in a common data store or some of this data may be stored in a different data store than others of this data. The data store may be or include computer memory.

The data store may include other data instead of or in addition to the data illustrated in FIG. 2. For example, the data store may include account data, which may also be referred to as profile data. The account data may include one or more credentials that may be used to authenticate a device as being associated with a particular transferor, account or profile. The credentials may be or include a unique identifier such as a username or electronic messaging address. The credentials may be or include any one or a combination of a password, PIN, biometric data or a token.

The central server 210 may include a completion monitoring engine 206 which monitors the status of initiated transfers. The completion monitoring engine 206 may detect transfer completions. A transfer completion occurs when all parts of the transfer have been transferred. Additionally or alternatively, the completion monitoring engine 206 may detect transfer failures. For example, a failure occurs when at least one part of a transfer is not successfully transferred. In some implementations, a part may be considered to not have been successfully transferred if the transfer of that part is not made at an expected time. The completion monitoring engine 206 may store, manage and/or update the transfer history 224 in the data store 220.

Figure 3:
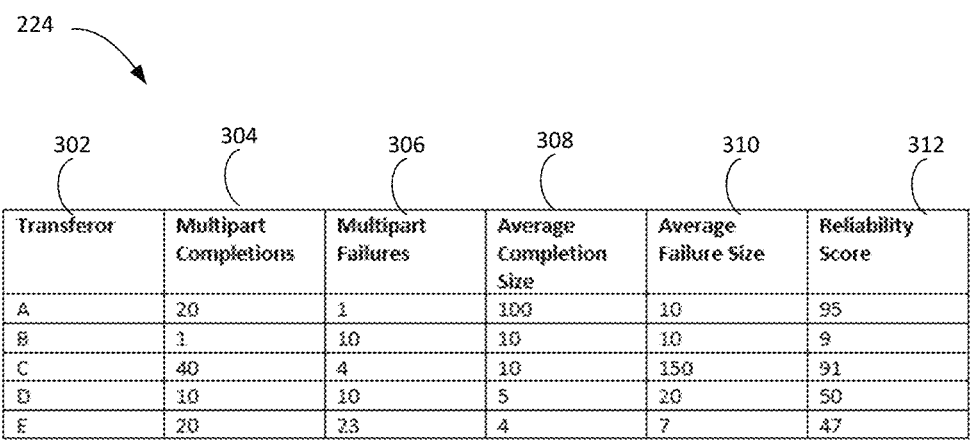
FIG. 3 shows, in table form, an example transfer history for a plurality of transferors.

Reference will now be made to FIG. 3 which shows, in table form, an example transfer history 224 for a plurality of transferors. The transfer history 224 may be tracked on a per-transferor basis. For example, the central server 210 may track the transfer history 224 so that the completion data defined therein may be associated with a particular transferor. In this way, the transfer history 224 shows the reliability of one or more transferors. In the illustrated example, the transfer history 224 separates data for each transferor using rows. Each row of data is associated with a different transferor. Or, put differently, each row may represent a different record and each record may be associated with a different transferor. It will be appreciated that other techniques for storing data on a per-transferor basis may be used apart from row-wise separation.

The transfer history 224 may include a transferor identifier 302 for each transferor represented therein. The transferor identifier 302 may be used to associate the particular transferor with particular completion data. The transferor identifier 302 may, for example, include one or more of an account identifier, a username, an account number, a device identifier such as an identifier associated with the transferor device 232, or an identifier of another type.

The transfer history 224 may include transfer completion data. The transfer completion data may be or include transfer success data 304 defining a number of successful multi-part transfers by a particular transferor and/or transfer failure data 306 defining a number of multi-part transfer failures by a particular transferor. In this way, the transfer history 224 represents how often each transferor has successfully completed a multi-part transfer and how often the transferor has failed to complete a multi-part transfer.

In some implementations the transfer history 224 may include data respecting the size of past transfers that were completed and/or not completed. For example, in at least some implementations, the transfer history 224 may include a metric of the size of past transfers that were successfully completed by each transferor and/or a metric of the size of past transfers that were not completed by each transferor. In the example of FIG. 3, the transfer history 224 includes an average completion size 308 and an average failure size 310.

In some implementations, the transfer history 224 may include a score associated with each transferor reflected therein. In the illustrated example, the transfer history 224 includes a reliability score 312. The reliability score 312 may be determined based on the past number of completions, past number of failures, average completion size and/or average failure size. In the illustrated example, the reliability score is determined as a percentage of the number of completions relative to the total number of transfer attempts. The total number of transfer attempts is the sum of the past multipart completions and multipart failures. Other scores, including other reliability scores may be represented in the transfer history 224 instead of or in addition to the reliability score 312.

Figure 4:
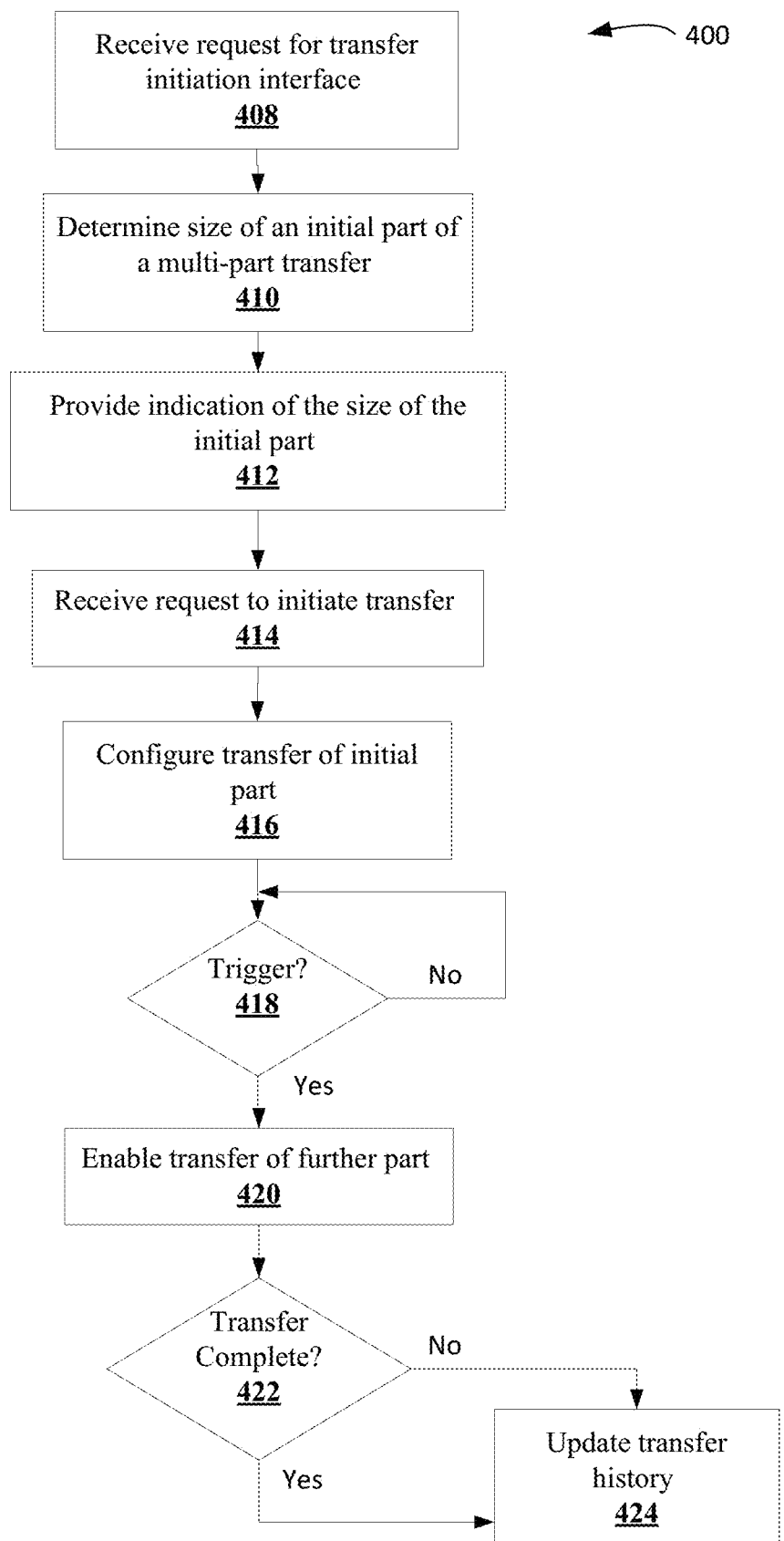
FIG. 4 shows, in flowchart form, an example method of dynamically configuring a multi-part transfer.

Reference is now made to FIG. 4, which shows an example of a method 400 for orchestrating a multi-part transfer. The method 400 may be implemented by a computing device having suitable computer-executable instructions for causing the computing device to carry out the described operations. For example, a computer system, such as one or both of the central server 210 and multi-part transfer orchestration engine 208 of FIG. 2 may include a processor that is coupled to a memory that stores computer-executable instructions that, when executed by the processor, cause the processor to perform a method described herein, such as the method 400 of FIG. 4.

The method 400 includes, at an operation 408, receiving a request for a transfer initiation interface. The request may be received by a computing system, such as the central server 210 of FIG. 2. The request may be received from a client device associated with a particular transferor. For example, the request may be received from a transferor device 232 of the type described with reference to FIG. 2. The request may be received in association with a particular transferor. For example, the request may be received when or after a transferor device 232 has authenticated with the central server 210 as being associated with a particular account or profile. Such authentication may be provided using one or more credentials which may be input at the transferor device 232 and compared with credentials stored at the data store 220. Additionally or alternatively, in some implementations, authentication may be provided through an authorization protocol, such as OAuth, which utilizes a third party server to assist with authentication.

The request received at operation 408 may be associated with a particular transferor and that request may be received when that transferor performs a particular operation on the transferor device 232. For example, the request may be considered to be received when the transferor, in an authenticated session, requests to retrieve a particular portion of an interface such as a particular web page.

As noted in the discussion above, a multi-part transfer may be customized for the particular transferor. For example, at an operation 410, the method 400 may include determining the size of an initial part of a multi-part transfer. The size may be determined based on a transfer history 224 for the particular transferor. For example, the transfer history 224 for the transferor associated with the request received at operation 408 may be obtained. In some implementations, such as that illustrated in FIG. 3, a transfer history 224 may include data for a plurality of transferors and so the transfer history 224 for a particular one of the transferors may be identified at the operation 410 and used to determine the size of the initial part of the multi-part transfer.

The reliability of the transferor may be used to determine the size of the initial part of the multi-part transfer. For example, at operation 410 the central server 210 may, when determining the size of the initial part of the multi-part transfer, determine a relatively smaller size of the initial part of the transfer if the particular transferor has a history of successfully completing multi-part transfers than would be determined if the particular transferor has a history of failing to complete multi-part transfers. In this way, transferors who are less prone to have transfer failures may not initially transfer as much of the transfer as transferors who are more prone to have transfer failures. By way of example, a relatively reliable transferor may be permitted to use a transfer similar to the transfer method illustrated in FIG. 1A, where the first part of the transfer is relatively small and a relatively unreliable transferor may be required to use a transfer similar to the transfer method illustrated in FIG. 1B where the first part of the transfer is relatively large in comparison to the first part of the transfer in FIG. 1A.

Various techniques may be used to represent the reliability of a particular transferor and to determine a transfer schedule, such as a size of an initial part, based on the reliability of the particular transferor. For example, reliability may be quantified using a reliability score or other metric. In some implementations, in order to determine the size of an initial part of a multi-part transfer at operation 410, the central server 210 may first determine a reliability score for the particular transferor. The reliability score may be determined in various ways including using techniques described with reference to the reliability score 312 of FIG. 3. The reliability score may be determined based on any one or a combination of: transfer success data 304, transfer failure data 306, a number of transfer attempts, an average completion size 308, and an average failure size 310. Accordingly, the initial part of the multi-part transfer may be determined based on a number of completions and/or a metric of the size of past transfers that were successfully completed by the particular transferor.

The reliability score may be positively affected from a greater number of transfer completions than a smaller number of transfer completions. The reliability score may be negatively affected from a greater number of transfer failures than a smaller number of transfer failures. The reliability score may be positively affected from a larger average completion size than from a smaller average completion size. The reliability score may be negatively affected from a larger average failure size than from a smaller average failure size.

The size of the initial part may be determined based on the reliability score for the particular transferor. For example, the size of the initial part may be determined based on a threshold-based comparison. As one possible example, a size of an initial part from a set of two possible sizes may be selected based on whether the reliability score is above or below a threshold. If the reliability score is above the threshold (indicating a higher reliability than the threshold), the smaller of the two sizes is selected but if the reliability score is below the threshold (indicating a lower reliability than the threshold), the larger of the two sizes is selected. A greater number of thresholds may be used and a greater number of possible sizes may be used.

In another example, the size may be determined using a mathematical operation applied to the reliability score. For example, the reliability score may be converted to an unreliability score, or a measure of how unreliable the transferor is and the reliability score may be expressed on a scale of 0 to 1. Then, the size of an initial transfer may be determined as the product of the reliability score and the total size of the transfer. For example, in the example of FIG. 3, the reliability score is expressed on a scale of 0 to 100. The reliability score may be converted to an unreliability score by subtracting the reliability score from 100. For example, transferor A has a reliability score of 95 and this may be expressed as an unreliability score of 5. This may then be divided by 100 so that it is expressed on a 0 to 1 scale. For transferor A this yields 0.05. If a total size of a transfer is 100 units, then transferor A would be expected to transfer 5 units initially. A similar calculation applied to transferor B illustrates that transferor B, who is much less reliable than transferor A, has an initial transfer of 91 units in size.

After a size of an initial part of a transfer has been determined at the operation 410, the central server 202 may provide, at an operation 412, a transfer initiation interface. The transfer initiation interface may be provided to the device from which the request was received at the operation 408.

Figure 5:
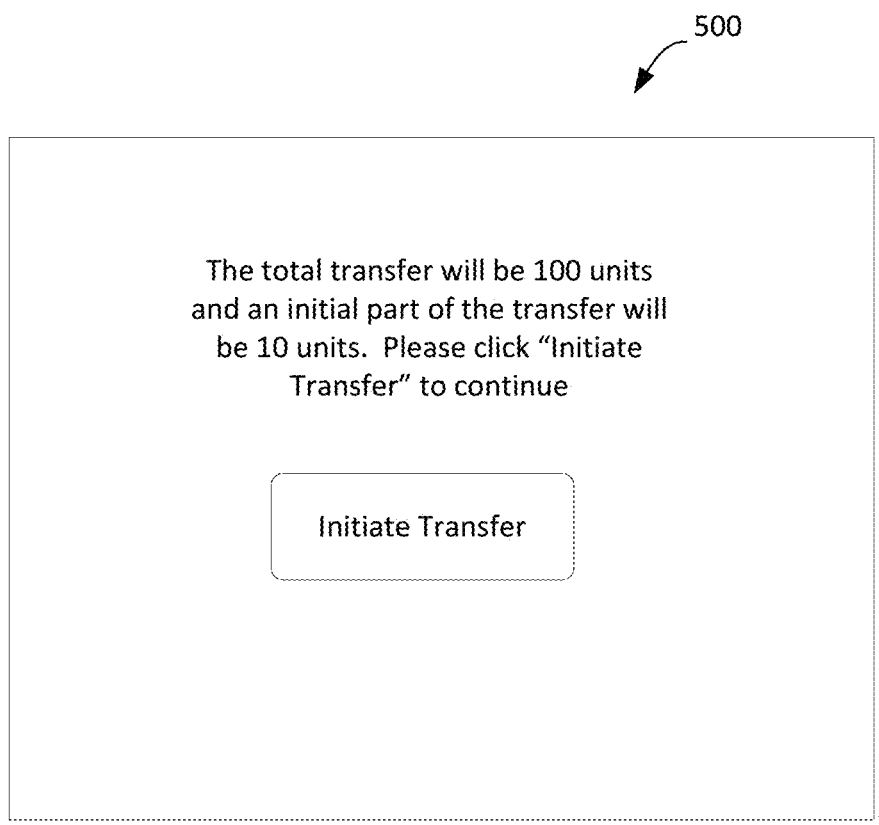
FIG. 5 shows an example user interface for initiating a multi-part transfer.

Reference will briefly be made to FIG. 5 which illustrates an example transfer initiation interface 500. As illustrated, the transfer initiation interface 500 indicates the size of an initial part of a transfer and a total size of a transfer. The illustrated transfer initiation interface 500 includes a selectable option to initiate a transfer of the multi-part transfer. The selectable option may be an interface element of any one of a variety of types including, for example, a virtual button or selectable link.

Returning again to FIG. 4, at an operation 414, the method 400 includes receiving a request to initiate a transfer of the initial part of the multi-part transfer. The request may be received through the transfer initiation interface. For example, the request may be received when the selectable option of the transfer initiation interface is selected or otherwise activated.

In response to receiving the request to initiate the initial part of the multi-part transfer, the central server 202 may, at an operation 416, configure a transfer of the initial part of the transfer from the particular transferor. For example, the central server 202 may cause a transfer of the initial part of the transfer to be made from the first resource store 240 to the second resource store 242.

After an initial part of a transfer has been made, the central server 202 may wait for a trigger condition to enable a transfer of a further part of the multi-part transfer. The trigger may be of various types. For example, in one implementation, the trigger may be said to occur after a predetermined period of time has elapsed following the transfer of the initial part. Another example of a possible trigger may be said to occur when an indicator of readiness is received from the recipient device 234. The indicator of readiness indicates to the central server that the recipient device 234 is ready for the next part of the transfer.

The central server 202 monitors for the trigger at an operation 418 and, when the trigger is detected, enables the further part of the transfer at an operation 420. As an example of how the further part of the transfer may be enabled, the central server 202 may send, to the transferor device 232, a notification or prompt to request that a transfer of a next part be initiated. The notification may be provided by way of an electronic message sent to a messaging address associated with the transferor device or provided using an application that is associated with the central server and that is installed on the transferor device 232. In some implementations, the notification may be a web push notification delivered through a web browser stored on the transferor device 232.

The notification or prompt may include a selectable option for initiating a transfer of a next part of the multi-part transfer.

The method 400 may include an operation 422 of determining whether the transfer was successfully completed. The operation 422 may be performed after defined criteria is determined, by the central server 202, to be satisfied. For example, the operation 422 may be performed after a predetermined period of time has elapsed following the operation 420.

The multi-part transfer is determined to be successfully completed if all parts of the multi-part transfer have been successfully transferred. The multi-part transfer is determined to not be successfully completed if one or more of the parts of the multi-part transfer are not successfully transferred.

At an operation 424, the central server 210 may update the transfer history 224. More particularly, if the transfer is successfully completed, the transfer history may be updated to reflect that the transfer was successfully completed and, if the transfer is not successfully completed, the transfer history may be updated to reflect that the transfer was not successfully completed. In this way, future iterations of the method 400 for the same transferor may result in a different size of an initial part being determined at the operation 410.

Figure 6:
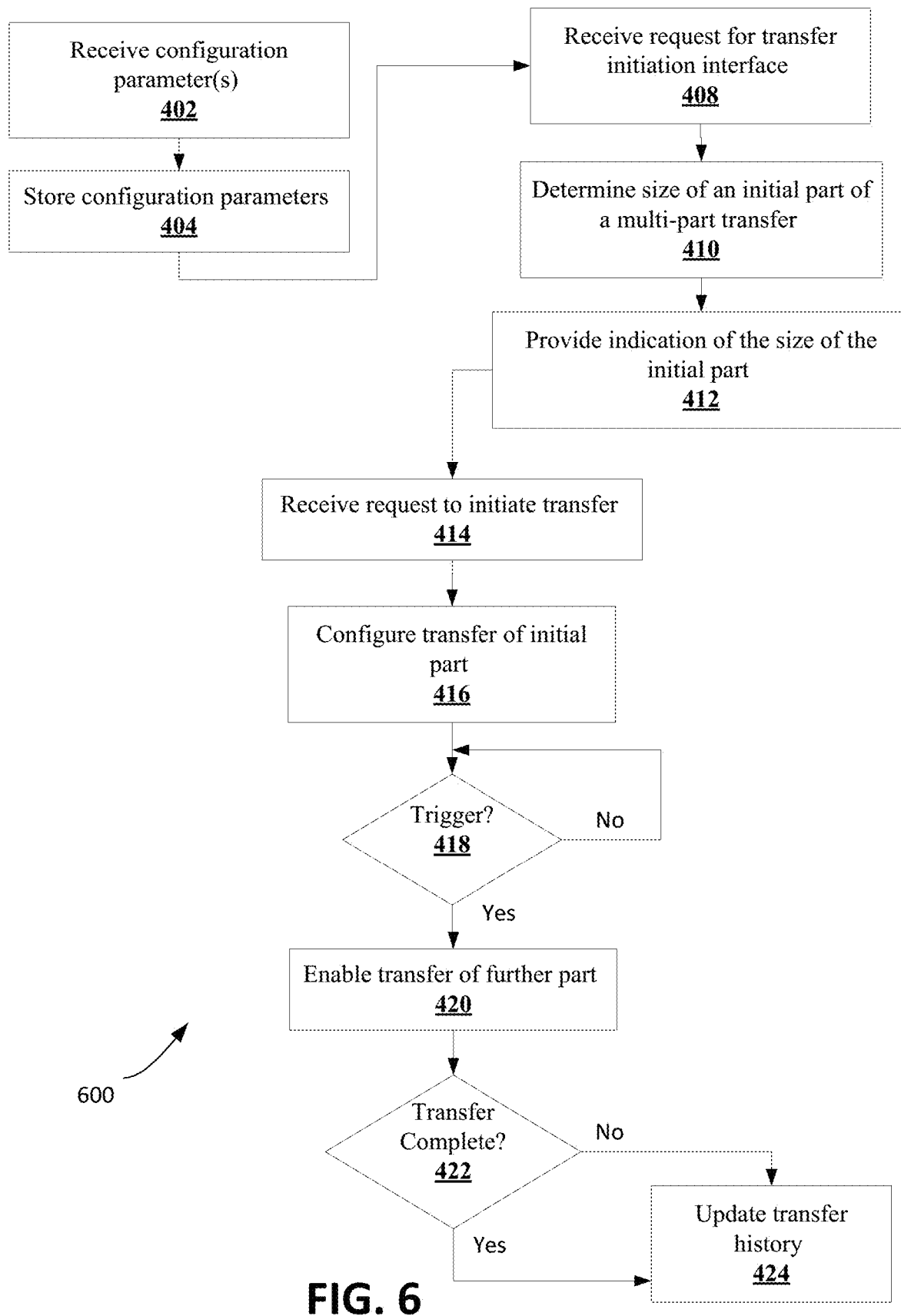
FIG. 6 shows, in flowchart form, a further example method of dynamically configuring a multi-part transfer.

Reference is now made to FIG. 6, which shows another example of a method 600 for orchestrating a multi-part transfer. The method 600 may be implemented by a computing device having suitable computer-executable instructions for causing the computing device to carry out the described operations. For example, a computer system, such as one or both of the central server 210 and multi-part transfer orchestration engine 208 of FIG. 2 may include a processor that is coupled to a memory that stores computer-executable instructions that, when executed by the processor, cause the processor to perform a method described herein, such as the method 600 of FIG. 6.

The method 600 of FIG. 5 includes, at an operation 402, receiving one or more configuration parameters 228 (FIG. 2). The configuration parameters may be as described above. For example, the configuration parameters 228 may define a range of supported initial part sizes. The configuration parameters may be received from a recipient device 234. For example, the configuration parameters may be input using a transfer configuration user interface provided on the recipient device 234 after the recipient device has authenticated to the central server 210. The transfer configuration user interface may be provided from the central server 210 to the recipient device 234.

The configuration parameters 228, once received, may be stored in a data store 220 associated with the central server 210.

The method 600 of FIG. 6 includes, after the operation 406 a number of operations 408, 410, 412, 414, 416, 418, 420, 422 and 424 which generally correspond to the commonly numbered operations of the method 400 of FIG. 4. However, the operation 410 of determining a size of an initial part of a multi-part transfer in the method 600 of FIG. 6 may be performed based, in part, on the configuration parameter(s) 228 defined by the recipient. The determination may also be made based on the transfer history for the particular recipient. For example, where the configuration parameter defines a range of supported initial part sizes, if the transfer history indicates that the transferor is reliable then a size of an initial transfer at a lower end of the range may be selected whereas if the transfer history indicates that the transferor is not reliable then a size of an initial transfer at the higher end of the range may be selected.

In this way, the recipient device may have some control over the size of the initial part of the transfer.

Figure 7:
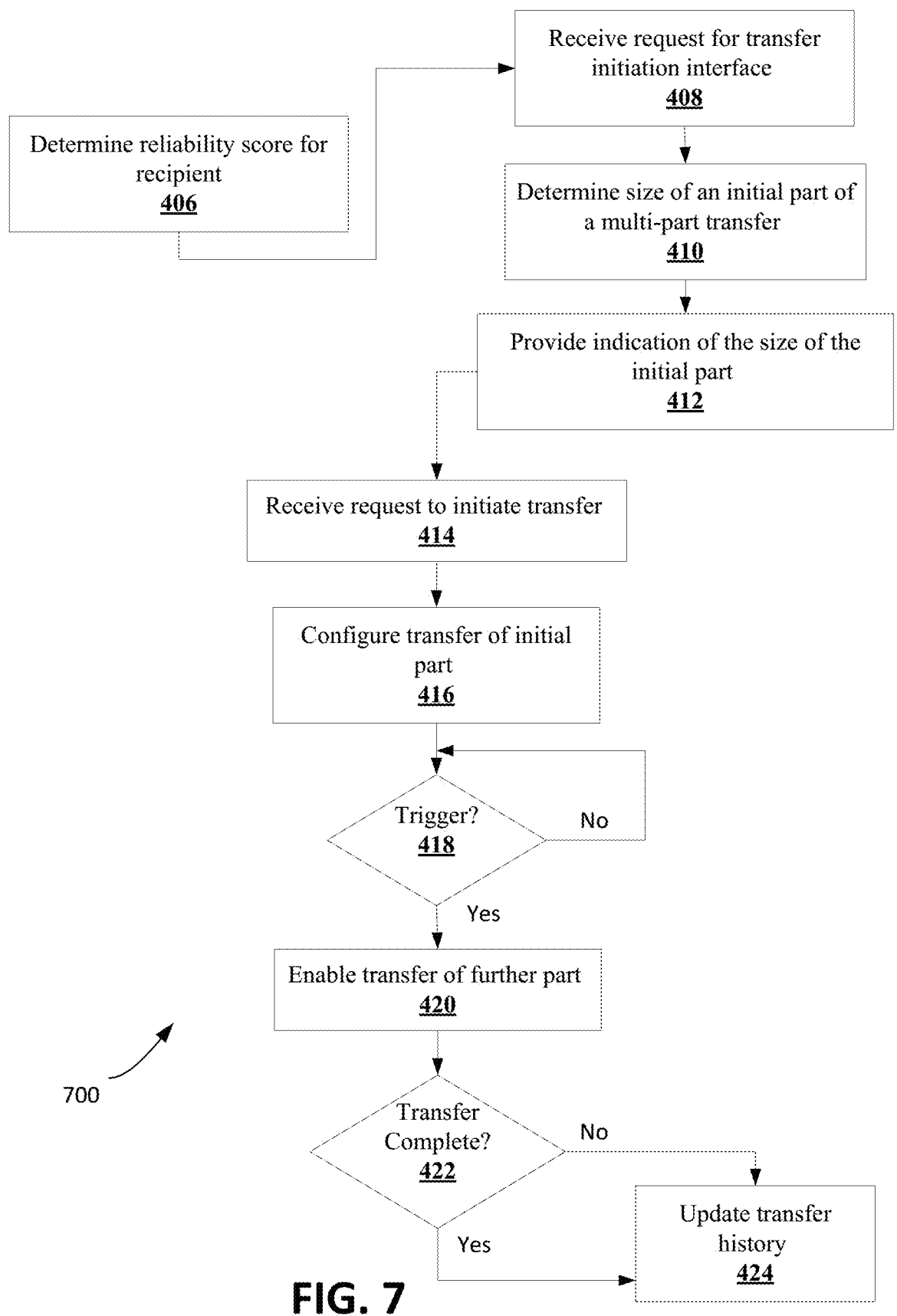
FIG. 7 shows, in flowchart form, a further example method of dynamically configuring a multi-part transfer.

Another variation of the method 400 of FIG. 4 will now be discussed with reference to FIG. 7. FIG. 7 shows another example of a method 700 for orchestrating a multi-part transfer. The method 700 may be implemented by a computing device having suitable computer-executable instructions for causing the computing device to carry out the described operations. For example, a computer system, such as one or both of the central server 210 and multi-part transfer orchestration engine 208 of FIG. 2 may include a processor that is coupled to a memory that stores computer-executable instructions that, when executed by the processor, cause the processor to perform a method described herein, such as the method 700 of FIG. 7.

The method 700 of FIG. 7 considers the reliability of the recipient in addition to the reliability of the transferor when determining a size of an initial part of a multi-part transfer. Unreliable recipients may have restrictions that do not apply to reliable recipients. Such restrictions may, for example, affect the size of a part of a transfer that a recipient is able to accept. For example, the size of an initial part of a transfer may be reduced if the recipient is unreliable than if the recipient is reliable. Reliability may be determined using a threshold and a transfer history for the recipient. The transfer history for the recipient may reflect that a completion has occurred when the recipient provides, to the central server, a signal indicating a readiness to receive a final part of a transfer. For example, in some implementations, the trigger that is detected at operation 418 and that enables (at operation 418) the transfer of a further part, is a readiness indicator received from the recipient device 234. If the recipient device 234 does not send the readiness indicator within a threshold period of time, the recipient may be said to have failed to complete the transfer and a metric indicating the recipient's reliability may be negatively affected. In this way, the recipient's reliability may not be negatively affected if the failure to complete was caused by the transferor not completing the transfer after transfer of the further part is enabled.

Accordingly, the method 700 may include an operation 406 of determining a reliability score for a recipient. The reliability score for the recipient may be determined based on a transfer history associated with the recipient. For example, the reliability score for the recipient may be determined based on one or more of: a number of transfer completions by the recipient, a number of transfer failures, a size of past completions and a size of past failures.

The method 700 may also include a number of operations 408, 410, 412, 414, 416, 418, 420, 422 and 424 which generally correspond to the commonly numbered operations of the method 400 of FIG. 4. One or more of these operations may be modified based on the reliability score for the recipient. For example, the operation 410 in which a size of an initial part of a multi-part transfer is determined may be modified so that the size of the initial part of the multi-part transfer is also determined based on the reliability score for the recipient. The reliability of the transferor may still be considered in determining the size of the initial part, but the reliability score of the recipient may also affect the size. For example, the computing system performing the method 700 may determine a maximum size of initial parts for transfers to the recipient based on the reliability score for that recipient. The size of an initial part for a transfer from a particular transferor may then be determined to not exceed the maximum size for initial parts for transfers to that recipient.

After the size of the initial part is determined for the particular transferor and recipient, operation 412 may be performed as described above with reference to the method 400 of FIG. 4. However, in at least some implementations, the transfer initiation interface may be modified to include the reliability score for the recipient. For example, the transfer initiation interface may indicate a measure of the reliability of the recipient.

The operations 414 to 424 may then be performed as described above with reference to the method 400 of FIG. 4. However, in at least some implementations the operation 424 in which the transfer history is updated may also be performed for the recipient. For example, a transfer history associated with the particular recipient may be updated so that it may be used at subsequent iterations of the operation 406 and/or operation 410 of the method 700.

The method 700 of FIG. 7 may also be modified to include the configuration parameter features of the method 600 of FIG. 6 described above. For example, the operation 402 and/or the operation 404 may be included in the method 700 of FIG. 7 and may be used at the operation 410 to determine the size of the initial part of the multi-part transfer.

Other variations of the methods 400, 600, 700 described above are contemplated. For example, for at least some transferors, the operation 410 of the methods 400, 600, 700 may be performed to determine a size of more than two transfer parts and the operations 418 and 420 may be repeated until all transfer parts have been enabled. For example, in some implementations, unreliable transferors may have their transfers divided into a greater number of parts than reliable transferors. For example, the central server may schedule a transfer for a reliable transferor in the manner illustrated in FIG. 1A and schedule a transfer for an unreliable transferor in the manner illustrated in FIG. 1C. As illustrated in FIG. 1A, the reliable transferor's transfer is separated into a fewer number of parts than the unreliable transferor's transfer, as illustrated in FIG. 1C. The overall size of the transfers may be the same, but the number of transfers may be greater for the relatively unreliable transferor than for the relatively reliable transferor. In the illustrated example, the reliable transferor's transfer is a two-part transfer and the unreliable transferor's transfer is a three-part transfer. Reliability may be assessed numerically using the techniques described above and categorization of a particular transferor as being "reliable" or "unreliable" may be based on a comparison of the numerical representation of reliability and a threshold.

The central server may also use the technique illustrated in FIG. 1D for unreliable transferors. For example, in some implementations, when a transferor is determined to be unreliable, a time period between successive transfers may be reduced from the time period that is used for reliable transferors. Put differently, an unreliable transferor may be required to transfer a further part of a multi-part transfer sooner than a reliable transferor.

The system and methods described herein may be used to manage bandwidth or other computing resources where larger transfers require greater bandwidth or other computing resources. For example, the techniques may be used to better spread bandwidth or other computing requirements over a large period of time. The techniques may be used for other purposes including, for example, to dynamically determine a deposit amount. A deposit may be a pre-sale deposit used to reserve an item that is not yet available for sale but that will be available for sale at a later date and the trigger of the operation 418 may occur when the item becomes available for sale. The second part of the transfer may represent a balance that is due when the item becomes available.

Figure 8:
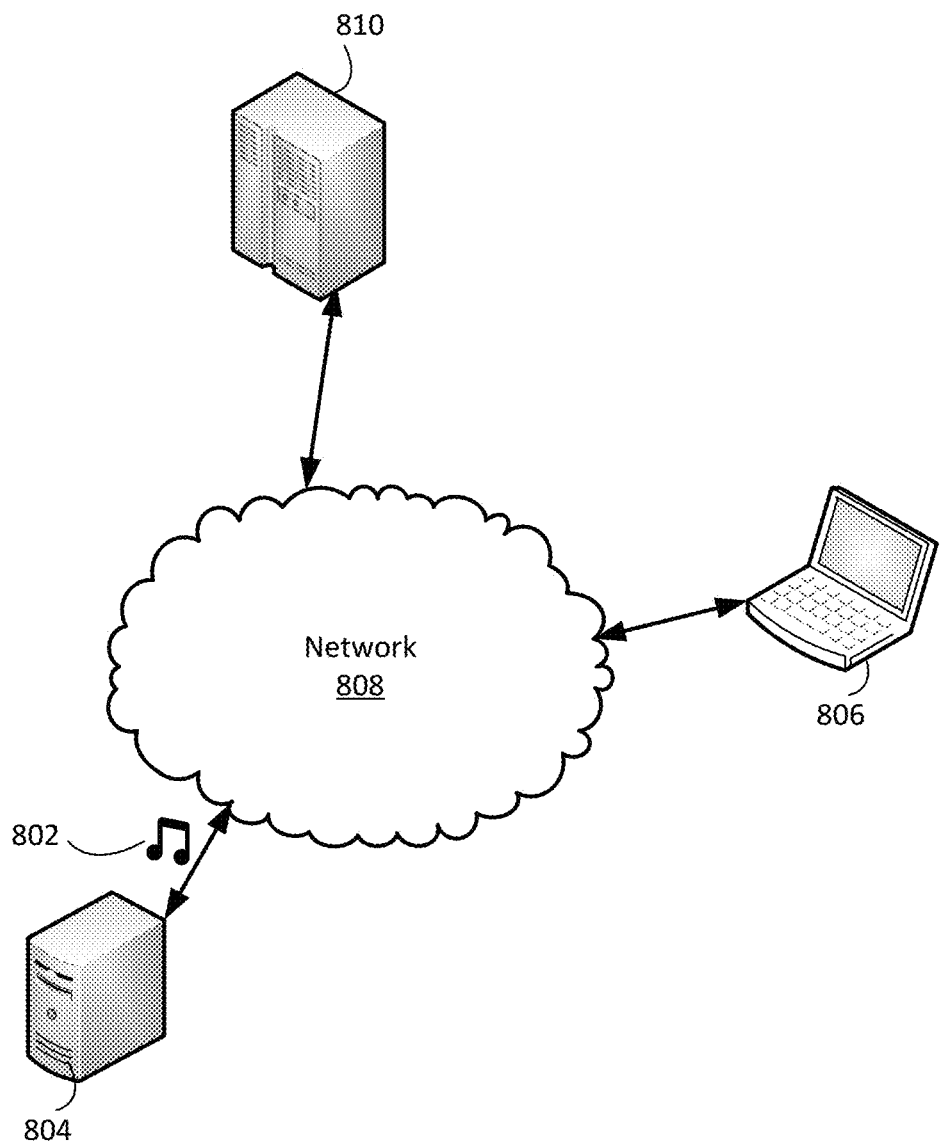
FIG. 8 is a block diagram of an example multi-part transfer system for transferring content.

Referring to FIG. 8, in another possible example, the system may be used to transfer content 802, such as a media file between computing systems 804, 806. The computing systems 804, 806 may be connected via a network 808. The network 808 may be connected to a central server 810 which is configured to perform a method described herein. The media file may be a file that is purchased over an e-commerce platform, for example, and the transferor may be a merchant associated with the media file and the recipient may be the purchaser of the media file. The media file may, in some implementations, be formatted in a manner that allows the initial part to be usable prior to receipt of the second part. Where the media file is delivered by an unreliable transferor, the initial part may be greater than when the media file is delivered by a reliable transferor. After the first part of the media file is received, the recipient may begin to output that part for consumption with the expectation that the transferor will send the next part of the media file before the already-delivered part is fully consumed. Since unreliable transferors have a smaller part remaining to be delivered than for reliable transferors, the likelihood that all parts will be delivered on time for all transferors is increased.

Although implementation on an e-commerce platform, as such, is not required, it may be illustrative to provide further details regarding the components and operations of one or more example e-commerce platforms. In at least some implementations, the functions of the central server described above may be provided by or implemented on an e-commerce platform such as an e-commerce platform of the type that will now be described.

An Example e-Commerce Platform

Figure 9:
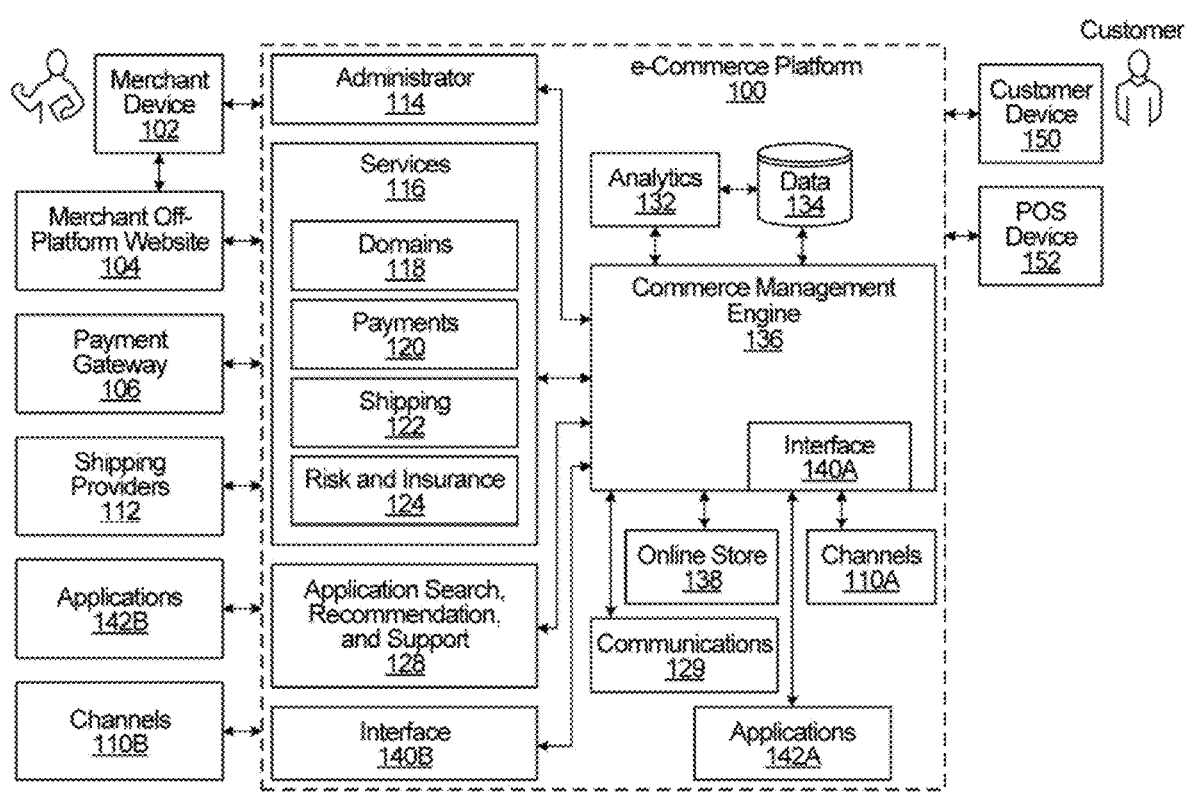
FIG. 9 is a block diagram of an e-commerce platform, according to an example embodiment.

FIG. 9 illustrates the example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 9, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data repository 134) such as, for example, through a network connected to the e-commerce platform 100. For example, the online store 138 may serve or send content in response to requests for data from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., in data repository 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfilment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 10:
FIG. 10 is an example of a home page of an administrator, according to an example embodiment.

FIG. 10 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 10. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfilment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 9, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfilment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfilment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfilment component of the commerce management engine 136. The fulfilment component may group the line items of the order into a logical fulfilment unit of work based on an inventory location and fulfilment service. The merchant may review, adjust the unit of work, and trigger the relevant fulfilment services, such as through a manual fulfilment service (e.g., at merchant managed locations) used when the merchant picks and packs the products in a box, purchase a shipping label and input its tracking number, or just mark the item as fulfilled. Alternatively, an API fulfilment service may trigger a third-party application or service to create a fulfilment record for a third-party fulfilment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

The e-commerce platform 100 may be configured to implement one or more of the methods described herein. By way of example, the e-commerce platform may dynamically determine a deposit amount or a size of a first part of a content transfer. For example, the commerce management engine 136 may be configured to dynamically determine a deposit amount based on configuration parameter(s) defined for a particular online store 138. For example, the configuration parameters may be provided by the merchant device 102; for example, through the interface 140A-B. Then, when a customer device 150 is used to interact with the online store 138 through the e-commerce platform 100, the e-commerce platform 100 may dynamically determine a deposit amount and/or a size of a first part of a content transfer. In this way, different customer devices 150 may indicate different deposit amounts and/or sizes of a first part of a content transfer.

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method comprising:
   receiving, by a computing system and from a client device associated with a particular transferor, a request for a transfer initiation interface;
   determining, based on whether a transfer history for the particular transferor indicates that the particular transferor has a history of successfully completing multi-part transfers, a size of an initial part of a multi-part transfer, wherein a smaller size of the initial part is determined when the particular transferor has a history of successfully completing multi-part transfers than would be determined when the particular transferor has a history of failing to complete multi-part transfers; and providing, to the client device, the transfer initiation interface, the transfer initiation interface indicating the size of the initial part of the multi-part transfer and including a selectable option to initiate the transfer of the initial part of the multi-part transfer.

2. The method of claim 1, further comprising:

receiving a request to initiate a transfer of the initial part of the multi-part transfer through the selectable option of the transfer initiation interface; and after receiving the request to initiate the transfer of the initial part of the multi-part transfer, configuring a transfer of the initial part of the transfer from the particular transferor.

3. The method of claim 1, wherein determining the size of the initial part of the multi-part transfer includes determining a reliability score for the particular transferor and wherein the size of the initial part is determined based on the reliability score for the particular transferor.

4. The method of claim 3, wherein the size of the initial part of the multi-part transfer is determined based on a metric of the size of past transfers that were successfully completed by the particular transferor.

5. The method of claim 3, wherein the size is further determined based on a configuration parameter defined by a recipient.

6. The method of claim 5, wherein the configuration parameter defines a range of supported initial part sizes.

7. The method of claim 3, further comprising:

determining a reliability score for a recipient, and wherein the transfer initiation interface includes the reliability score for a recipient.

8. The method of claim 7, wherein the reliability score for the recipient is determined based on a transfer history associated with the recipient.

9. The method of claim 3, further comprising:

determining a reliability score for a recipient, and wherein the size of an initial part of the multi-part transfer is determined based on the reliability score for a recipient.

10. The method of claim 9, further comprising determining a maximum size of initial parts for transfers to the recipient based on the reliability score for the recipient, and wherein the size of the initial part is determined to not exceed the maximum size for initial parts.

11. A computing system, comprising:

a processor; and a memory coupled to the processor and storing computer-executable instructions that, when executed by the processor, are to cause the processor to:

receive, from a client device associated with a particular transferor, a request for a transfer initiation interface;

determine, based on whether a transfer history for the particular transferor indicates that the particular transferor has a history of successfully completing multi-part transfers, a size of an initial part of a multi-part transfer, wherein a smaller size of the initial part is determined when the particular transferor has a history of successfully completing multi-part transfers than would be determined when the particular transferor has a history of failing to complete multi-part transfers; and provide, to the client device, the transfer initiation interface, the transfer initiation interface indicating the size of the initial part of the multi-part transfer and including a selectable option to initiate the transfer of the initial part of the multi-part transfer.

12. The computing system of claim 11 wherein the instructions further cause the processor to:

receive a request to initiate a transfer of the initial part of the multi-part transfer through the selectable option of the transfer initiation interface; and after receiving the request to initiate the transfer of the initial part of the multi-part transfer, configure a transfer of the initial part of the transfer from the particular transferor.

13. The computing system of claim 11, wherein determining the size of the initial part of the multi-part transfer includes determining a reliability score for the particular transferor and wherein the size of the initial part is determined based on the reliability score for the particular transferor.

14. The computing system of claim 11, wherein the size of the initial part of the multi-part transfer is determined based on a metric of the size of past transfers that were successfully completed by the particular transferor.

15. The computing system of claim 11, wherein the size is further determined based on a configuration parameter defined by a recipient.

16. The computing system of claim 15, wherein the configuration parameter defines a range of supported initial part sizes.

17. The computing system of claim 11, wherein the instructions further configure the processor to:

determine a reliability score for a recipient, and wherein the transfer initiation interface includes the reliability score for the recipient.

18. The computing system of claim 11, wherein the instructions further configure the processor to:

determine a reliability score for a recipient, and wherein the size of an initial part of the multi-part transfer is determined based on the reliability score for a recipient.

19. The computing system of claim 18, wherein the instructions further configure the processor to:

determine a maximum size of initial parts for transfers to the recipient based on the reliability score for the recipient, and wherein the size of the initial part is determined to not exceed the maximum size for initial parts.

20. A non-transitory, computer-readable medium storing computer-executable instructions that, when executed by a processor, are to cause the processor to:

receive, from a client device associated with a particular transferor, a request for a transfer initiation interface;

determine, based on whether a transfer history for the particular transferor indicates that the particular transferor has a history of successfully completing multi-part transfers, a size of an initial part of a multi-part transfer, wherein a smaller size of the initial part is determined when the particular transferor has a history of successfully completing multi-part transfers than would be determined when the particular transferor has a history of failing to complete multi-part transfers; and provide, to the client device, the transfer initiation interface, the transfer initiation interface indicating the size of the initial part of the multi-part transfer and including a selectable option to initiate the transfer of the initial part of the multi-part transfer.

* * * * *